Aug. 18, 1936.  E. NANFELDT  2,051,528
DISPLAY MECHANISM
Filed July 12, 1934  3 Sheets-Sheet 1
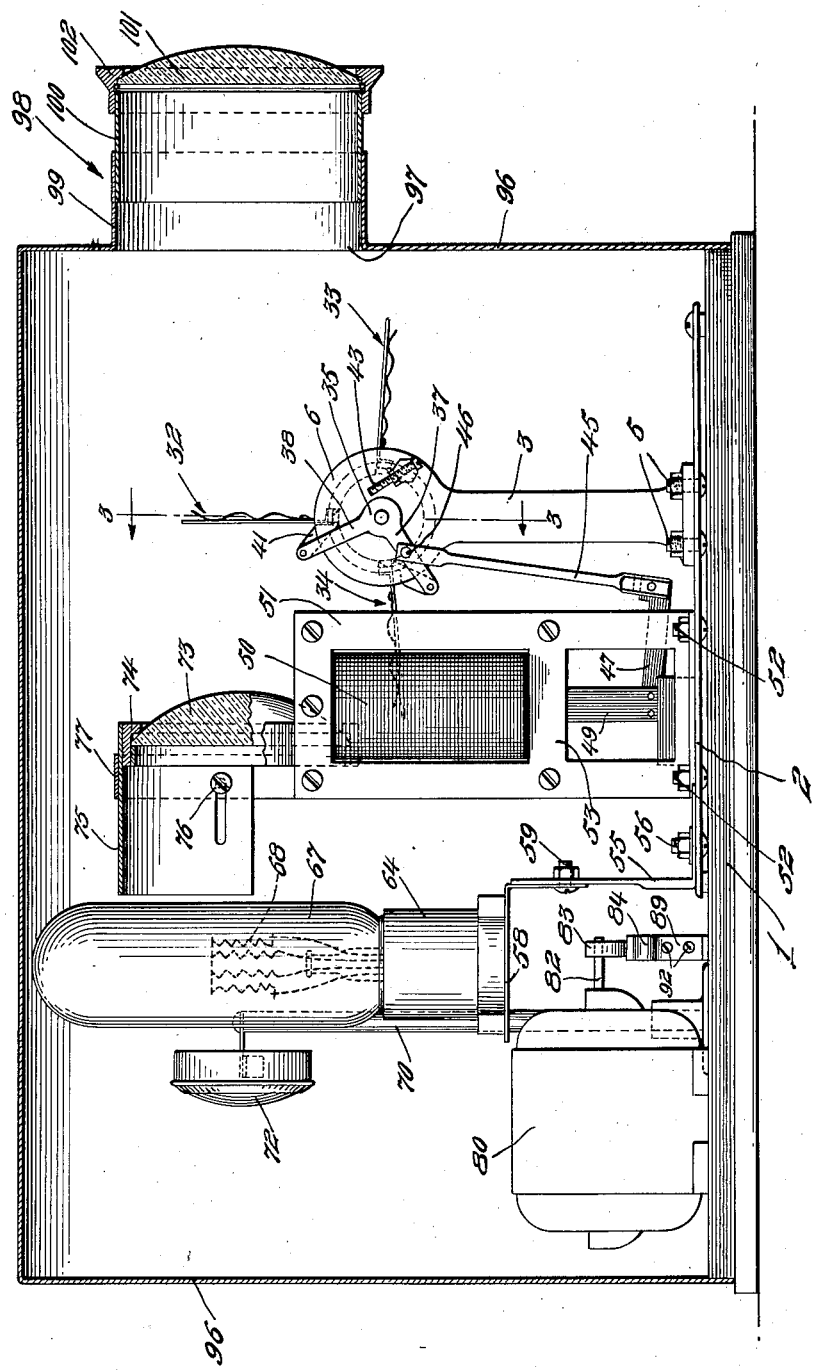
INVENTOR
Ernest Nanfeldt
BY Perley H. Plant
ATTORNEY

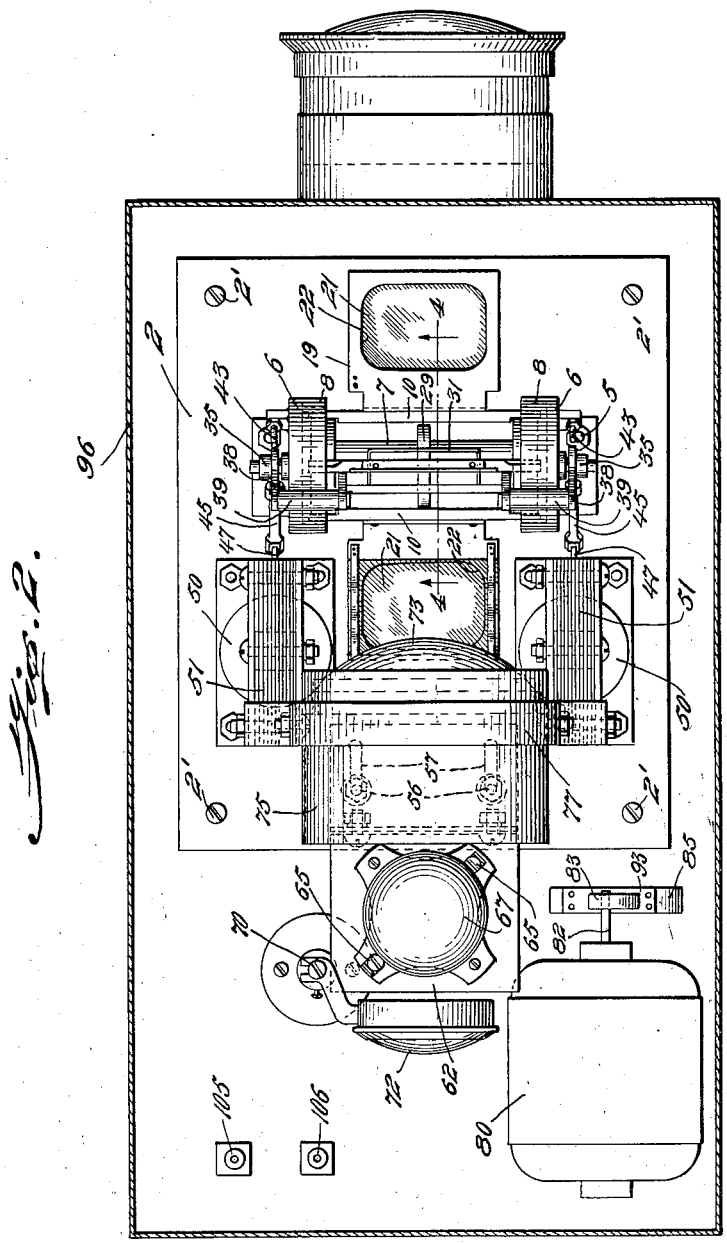

Aug. 18, 1936.  E. NANFELDT  2,051,528
DISPLAY MECHANISM
Filed July 12, 1934  3 Sheets-Sheet 3
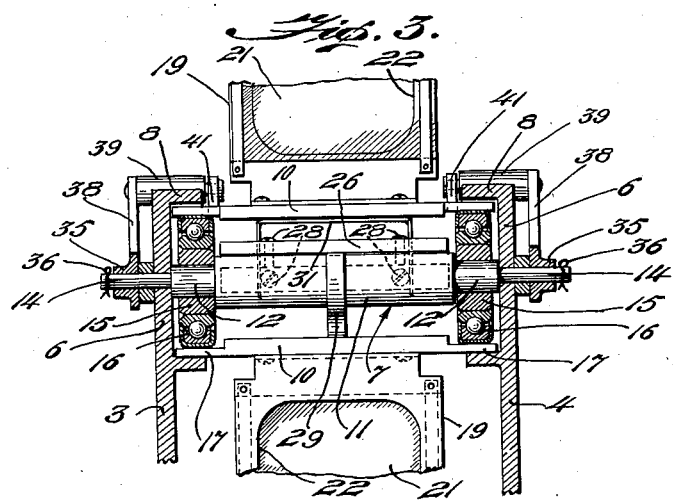
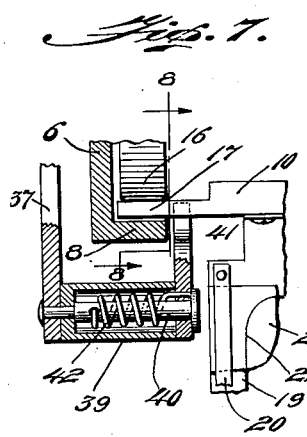
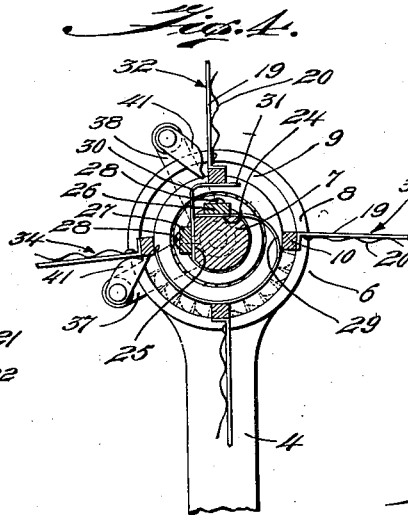
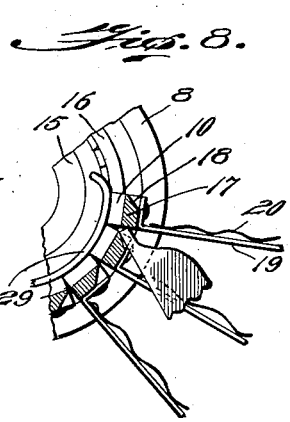
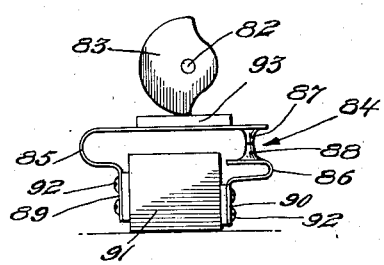
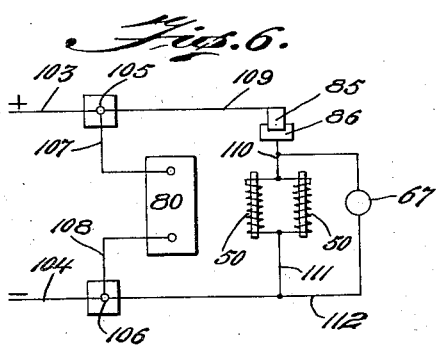
INVENTOR
Ernest Nanfeldt
BY Perley H. Plant
ATTORNEY Patented Aug. 18, 1936

2,051,528

UNITED STATES PATENT OFFICE 2,051,528

DISPLAY MECHANISM

Ernest Nanfeldt, New Haven, Conn., assignor to Respro, Inc., Cranston, R. I., a corporation of Rhode Island Application July 12, 1934, Serial No. 734,728

11 Claims. (Cl. 88—27)

This invention relates to an improved display mechanism which may comprise a source of light in combination with display members and display member holding and advancing mechanism for advancing the display members in a specified order to locate the same in display position or to bring them into the path of the light rays for projecting an image as exhibited by one of the display members upon a light receiving surface.

One object of the invention is the provision of means for projecting light images successively upon a light receiving surface.

A further object of the invention is the provision of novel means for positioning a plurality of display members successively into the path of light rays for projecting light images upon a receiving surface, and moving each display member out of the path of the light rays upon the advancement of the succeeding display member into the path of the light rays.

A further object of the invention is the provision of improved means adapted for actuation to locate a display member in light transmitting position and at the same time move the preceding display member entirely out of the path of the light rays.

Another object of the invention is the provision of a novel display means for moving one of a series of display members into position for display and at the same time removing a previously displayed member from view.

A further object of the invention is the provision of a display means for moving a series of display members along a closed path in such a manner as to bring each member into display position in the order of its succession and maintain the same in display position for a definite period.

Other objects and advantages of the invention relate to various improved means and combinations of means as well as novel arrangements of the parts for effecting the display of the display members as well as for projecting images thereof upon a light receiving surface as will be more fully set forth in the detailed description to follow.

Referring to the drawings:

Fig. 1 is a vertical sectional view through the enclosing casing, showing the operating parts of the mechanism in side elevation, Fig. 2 is a horizontal sectional view through a portion of the casing, showing a top plan view of the operating elements in their relation to each other, Fig. 3 is a vertical longitudinal sectional view through the display member advancing mechanism and its operating parts, taken substantially along the line 3—3 of Fig. 1, Fig. 4 is a vertical transverse sectional view through the display member advancing mechanism, taken substantially along the line 4—4 of Fig. 2, Fig. 5 is an end elevational view of the cam and interrupter mechanism operated by the electric motor, Fig. 6 is a diagrammatic view showing one arrangement of electric circuits for operatively connecting the motor, solenoids, and lamp with an electric current source, Fig. 7 is an enlarged view, partially in section, of one of the radial arms, together with the sleeve and pawl, showing the parts in operative relation with one of the display member supporting bars, and, Fig. 8 is an enlarged end view of certain of the display member supporting bars and the engaging pawl, as viewed from a position approximating that of the line 8—8 of Fig. 7.

In the embodiment of the invention illustrated herewith, I designates a base upon which may be supported in suitable operative relation with each other the mechanism for moving the display members into display position as well as appropriate means for passing light rays through the display members to cause an image thereof to be thrown upon a light receiving surface.

A plate 2 carried by the base I may have opposed standards 3 and 4 secured thereto in any suitable manner, as by bolts 5. The standards 3 and 4 are each provided with an enlarged head 6, the heads 6 being located in opposed relation with each other and connected by a central stationary shaft 7. The plate 2 may be secured to the base I by screws or other suitable fastening means 2'.

The enlarged heads 6 carried by or formed integral with the standards 3 and 4 are each provided with curved inwardly extending flanges 8 which may each form the outer wall of a curved channel 9 serving as a pathway for the ends of display member supporting bars 10.

The stationary shaft 7 may comprise an enlarged central portion 11, reduced portions 12 located adjacent to said central portion, and reduced ends 14 extending through suitable openings formed in the heads 6 and held against rotation relative to the heads in any suitable manner. Collars 15 may be fixed to the reduced portions 12 of the shaft 7 in any suitable or desired manner, and anti-friction bearings 16 are carried by each collar 15 to permit freedom of travel of the display member supporting bars 10 in the channel 9. The end 17 of each supporting bar 10 may be of such size as to fit within one of the channels 9 and one side face of each supporting bar is preferably inclined, as at 18, adjacent to the point of engagement by the advancing pawls to insure proper engagement of each supporting bar by the pawls. A display member holding plate 19 of any suitable character is carried by each supporting bar 10 and may be provided with suitable means, such as resilient holding members 20, for receiving and supporting a display member 21 in such a manner as to expose a portion of the display member 21 to view through the sight opening 22 formed in the plate 19. The display member may be a card, film, transparent plate or other suitable member provided with or carrying an image, picture advertising matter or other indicia to be displayed.

The shaft 7 may be provided with plane faces 24 and 25 to which clamping plates 26 and 27 may be secured, as by screws 28. The clamping plate 26 engages one end of one or more curved resilient members 29 to retain the same firmly in position so that the curved portion or portions thereof will press against the supporting bars 10 throughout a portion of the path of travel of the supporting bars in the channel 9 and maintain them in position for proper engagement by the advancing pawl. In a similar manner, the clamping plate 27 engages the opposite end portions of a resilient member 30, which is shaped to provide a central portion 31 located above the shaft 7 and substantially parallel therewith. The central portion 31 of the resilient member 30 is adapted to engage one of the display member supporting bars 10 when the display member is in display position, as indicated at 32 in Fig. 4 of the drawings, to maintain the display member properly in display position until further actuation by the advancing pawls moves it forwardly out of display position, to the point indicated by 33 in Fig. 4 of the drawings.

A bearing sleeve 35 is rotatably mounted upon each reduced end portion 14 of the shaft 7, outwardly of one of the heads 6, and may be held in position thereon by any suitable means, as by a cotter pin 36. Each bearing sleeve 35 is provided with radial arms 37 and 38 of similar construction, each of which is provided at its outer end with a tubular casing 39, enclosing a shaft 40 which may be fixedly secured to the arm and which has a pawl 41 pivotally mounted upon the end thereof. A spiral spring 42 may be mounted upon the shaft 40 and have one end secured thereto, while the opposite end of the spring 42 engages the pawl 41 to normally press it downwardly into engaging relation with portions of the display member supporting bars 10.

An adjustable stop member 43 may be carried by each head 6 for limiting the extent of movement of the rotatable bearing sleeves 36 as well as the extent of travel of the display member supporting bars 10 under the impulse imparted thereto by the operation of the solenoids.

Connecting rods 45 each have one end pivotally connected to one of the radial arms 37, as at 46, and the opposite end pivotally connected to an arm 47, which may be rigidly supported by the core member 49 of a solenoid 50.

Solenoid supporting frames 51, of similar construction, are each secured to the plate 2, as by bolts 52, and each provided with a transverse frame portion 53 supporting a solenoid coil 50 in suitable relation with one of the opposed standards 3 and 4, whereby each connecting rod 45 may be suitably positioned to pivotally connect one of the core members 49 with one of the arms 37 for the purpose of actuating the display member advancing means upon movement of the solenoid cores.

An angular plate 55 is secured to the plate 2 by bolts 56 in such a manner as to be adjustable in a direction longitudinally of the base 1 through the provision of slots 57. A second angular plate 58 has a portion adjustably secured to the angular plate 55 as by bolts 59 in such a manner as to permit vertical adjustment of the plate 58 relative to the plate 55.

A lamp socket 64, provided with electric terminals 65, is carried by the angular plate 58 and supports a light source, such as a filamentary lamp 67, provided with a filament 68 of any suitable character or design, in such a manner as to permit both vertical and longitudinal adjustment of the light source through relative movement of the plates 55 and 58 to bring the light source into suitable position relative to the lenses and display member for passing light rays through one of the display members.

A standard 70 carried by the base 1 adjustably supports a reflector member 72 in position to reflect light rays from the light emitting portion of the lamp 67 through a condensing lens 73 supported by a collar 74. The collar 74 is carried by a holder member 75, which is adjustably connected, as at 76, with a frame member 77, which may be connected to or form a part of a portion of the solenoid supporting frame 51.

Any suitable or desired type of electric motor 80 may be supported by the base 1 and provided with a shaft 82, to which is secured a cam 83 for operating a current interrupter 84. The current interrupter 84 may comprise resilient members 85 and 86, provided with contact portions 87 and 88 respectively, and portions 89 and 90 adapted for attachment to an insulating block 91 as by screws 92. The resilient member 85 carries an insulating block 93 adapted to be engaged by the cam 83 for operating the interrupter 84.

A casing 96 is provided for attachment to the base 1 to enclose the operating elements carried by the base and has an opening 97 formed therein and located substantially within the path of reflected light rays from the lamp 67. A tube 98, which may be formed of adjustably telescoping sections 99 and 100, is carried by the casing 96 and extends outwardly from the opening 97 to support a magnifying lens 101 which may be secured to the section 100 in any suitable manner, as by collar 102.

In the operation of the mechanism shown and described any suitable electric current source, as indicated by conductors 103 and 104, may be connected to terminals 105 and 106 respectively and joined to the terminals of the motor 80 by conductors 107 and 108. A conductor member 109 connects the terminal 105 with the interrupter member 85, while a branched conductor 110 connects the interrupter member 86 with the solenoid coils 50 and lamp 67 in multiple. Conductor members 111 and 112 connect the solenoid coils 50 and lamp 67 with the terminal 106.

Upon supplying electric current to the motor 80 from the line conductors 103 and 104, the motor shaft 82 rotates the cam 83 to open and close the contacts 87 and 88 to the solenoid coils 50 and lamp 67. Closing the circuits through the solenoids 50 immediately raises the cores 49 and thereby rotates the sleeves 35 on the reduced ends 14 of the shaft 7 to move the radial arms 37 and 38 in a clockwise direction, as seen in Fig. 1, and advance the display member occupying the position indicated by 32 into the position indicated by 33 and at the same time advance the display member occupying the position indicated by 34 into display position, as indicated by 32.

As the lamp 67 is lighted simultaneously with the raising of the solenoid cores 49, the display member 21 which has been advanced to the position indicated by 32, is in position for light rays to be passed therethrough from the lamp 67 to project an image carried by the display member upon a light receiving surface through reflected light rays passed through the lenses 73 and 101. The display member which is thus located in display position, as indicated by 32, is maintained in such position by the portion 31 of the resilient member 30 until further advanced by action of the pawls 41.

Upon the opening of the contacts 87 and 88 through the passing of the cam surface, the cores 49 fall into the positions shown in Fig. 1 of the drawings, and the flow of current through the lamp 67 is discontinued. The fall of the cores 49 serves to return the sleeves 35 and arms 37 and 38 into retracted position, as shown in Fig. 1, where the pawls 41 carried by the arms 37 and 38 engage the display member supporting bars of the display members located at 34 and 32 respectively, for advancing the display member at 34 into display position at 32 and the display member at 32 into position at 33 upon again closing the contacts 87 and 88.

Through the provision of means for adjusting the lamp 67 both vertically and longitudinally of the base 1, and the provision of means for adjusting the lenses 73 and 101 longitudinally of the path of reflected light rays from the lamp 67 the lamp may be suitably positioned for locating the filamentary portion 68 in appropriate alignment with the common axis of the lenses, and the lenses may be adjusted to position them properly with reference to the location of the display member when the same is mounted in its display position, as indicated at 32.

The present display mechanism is capable of and adapted for use either alone or in conjunction with a projection display mechanism of the character shown and described in my copending application Serial No. 734,727 filed July 12, 1934. When employed in conjunction with a projection display mechanism of the character above mentioned, both mechanisms may be controlled concurrently from a common cam shaft, or they may be controlled separately, as is found most desirable in practice. In employing the display mechanisms together the timing of the circuit interrupters may be such as to effect a concurrent display or an alternate display by the mechanisms as may be desired.

While I have shown and described herein the means for advancing and retaining each display member in display position as adjunctive with the light projecting mechanism to project images carried by or formed upon the display members upon a light receiving surface, the present display member advancing and display means may be employed for the direct display in any suitable manner of pictures, advertising matter or other indicia as may be found desirable.

The several display members are mounted upon supporting bars movable about a common path which may be circular or of other suitable form, and as shown, the path of travel of the supporting bars may be located upon one side of the path of the reflected light rays, and the display members so mounted as to be capable of successive movement into the path of the light rays, or into display position while separated from the remaining display members.

What I claim is:

1. In a display mechanism, a light source, a reflector, members spaced from each other and provided with correspondingly shaped continuous guideways located in opposed relation with each other and forming a closed path, a plurality of separately actuable display members each mounted for bodily sliding movement along and angular movement relative to the path defined by said guideways independently of the remaining display members, light control means for lighting and extinguishing said light alternately, and means operable by said light control means for engaging adjacent display members and moving one of said display members out of the path of the light rays and moving another of said members into the path of the light rays substantially simultaneously with the lighting of said light source.

2. In a display mechanism, a lighting means, a reflector therefor, members provided with correspondingly positioned continuous guideways defining a closed curvilinear path, a plurality of display members each mounted for bodily sliding movement throughout said curvilinear path and angular movement relative thereto independently of the remaining display members into and out of the path of reflected light rays from said lighting means, means for moving one of said display members separately into the path of reflected light rays and means for retaining the same within the path of reflected light rays during a definite time interval.

3. In a display mechanism, spaced opposed members provided with correspondingly shaped continuous guideways defining a closed path having a curvilinear portion, a plurality of separate display members each mounted for bodily sliding movement along and axial movement angularly of said closed path, means for sliding one of said display members bodily along said path, means for moving the same angularly of a point within said path into isolated display position away from the remaining display members, and means for retaining said display member in its isolated display position and in fixed angular position relative to said closed path.

4. In a display mechanism, spaced opposed members provided with correspondingly shaped continuous guideways definingg a closed path having a curvilinear portion, a plurality of separate display members having portions bodily slidable in said guideways and portions movable angularly relative to and outwardly of said closed path throughout its extent, each of said display members being movable angularly about its corresponding bodily slidable portion as an axis, and means engaging each display member successively to slide said display member along said closed path into isolated display position away from the remaining display member, and means for moving the same angularly of the said closed path at the end of its sliding movement and retainingg the same in isolated display position.

5. In a display mechanism, a light source, a reflector for said light source to reflect light rays therefrom along a definite path, a plurality of separate display member supports located within and mounted for independent bodily sliding movement along a closed path located entirely without the path of said reflected light rays, a display member carried by each support, means for moving one of said display member supports along said closed path and into position for the isolated display of the display member carried thereby within the path of the reflected light rays and away from the remaining display members, and means for retaining said display member in its display position.

6. In a display mechanism, display members each located outwardly of a closed path having a curvilinear portion and mounted for movement into display position outwardly of said curved path, each display member being provided with a display member support mounted for free sliding movement throughout said closed path independently of the movement of the remaining display member supports while maintaining the display member outwardly of said closed path, means for sliding each display member support a predetermined distance along said closed path and into position for the display of the display member carried thereby in isolated relation with the remaining display members, means for passing light rays through said display member while in isolated display position, and means for actuating said light ray passing means in timed relation with said display member moving means.

7. In a display mechanism, a light source, a reflector member, spaced lenses located in substantial alignment with said light source and reflector member, spaced opposed members provided with corresponding surface recesses forming guideways defining a continuous path having a curvilinear portion substantially tangential to the path of reflected light rays, a plurality of display members provided with supporting bars having portions slidably mounted within said recesses for movement about said path, and means for moving each display member supporting bar independently of the other bars to locate one of said display members within and at substantially right angles to the path of reflected light rays from said light source and at the same time move the remaining display members into a position entirely without the path of said reflected light rays.

8. In a display mechanism, a light source, a reflector member for reflecting light rays from said light source along a definite path, a plurality of independently movable display members mounted for bodily sliding movement about and limited angular movement relative to a closed path having a curvilinear portion located substantially tangential with the path of the reflected light rays, means engaging said display members successively for advancing each display member into isolated display position within the path of the reflected light rays, and common means for actuating said display member advancing means and lighting said light source.

9. In a display mechanism, oppositely positioned members provided with correspondingly positioned surface recesses forming guideways defining a closed path, a plurality of display members each provided with an elongated support having portions thereof slidably mounted in said opposed guideways, means for retaining one of said display member supporting means in isolated position within said closed path to display its display member, and intermittently actuated means for advancing two of said display member supporting means simultaneously independently of the remaining display member supporting means to move one of said display members from display position into non-display position and the other of said members from non-display position into display position.

10. In a display mechanism, a plurality of separate display members each bodily transferable relative to each other along a curvilinear path and angularly movable relative to said path, supporting means for each display member, means engaging the supporting means of two of said display members concurrently to transfer said display members bodily along said curvilinear path, one from display position to non-display position and the other from non-display position to display position substantially simultaneously, means for moving said last named display member angularly of said curvilinear path into display position at the end of its forward movement, and resilient means for releasably retaining said last named display member in isolated display position.

11. In a display mechanism, spaced opposed members provided with correspondingly shaped continuous guideways defining a closed path having a curvilinear portion, a plurality of separate display members each mounted for independent bodily sliding movement along and axial movement angularly of said closed path, oppositely positioned radial arms arranged in pairs and mounted for movement concentrically with relation to portions of said guideways and each provided with means for engaging a portion of one of said display members, means for moving said oppositely positioned arms concentrically with relation to portions of said guideways in unison to engage and advance two of said display members substantially simultaneously, one from isolated display position to non-display position and the other from non-display position to isolated display position, and means for retaining the member moved to isolated display position in isolated display position and in fixed angular relation with said closed path.

ERNEST NANFELDT.